US012603814B2

(12) United States Patent (10) Patent No.: US 12,603,814 B2
Quan et al. (45) Date of Patent: Apr. 14, 2026

(54) ARCHITECTURE, METHOD AND DEVICE FOR MANAGING CLOUD PLATFORM, AND STORAGE MEDIUM

(71) Applicant: ZTE CORPORATION, Shenzhen (CN)

(72) Inventors: Rui Quan, Shenzhen (CN); Hao Chen, Shenzhen (CN); Xuesheng Liu, Shenzhen (CN); Daigang Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 143 days.

(21) Appl. No.: 18/293,627

(22) PCT Filed: May 7, 2022

(86) PCT No.: PCT/CN2022/091530
§ 371 (c)(1),
(2) Date: Jan. 30, 2024

(87) PCT Pub. No.: WO2023/015988
PCT Pub. Date: Feb. 16, 2023

(65) Prior Publication Data
US 2024/0348501 A1 Oct. 17, 2024

(30) Foreign Application Priority Data
Aug. 10, 2021 (CN) .......................... 202110915014.6

(51) Int. Cl.
*G06F 13/00* (2006.01)
*G06F 8/20* (2018.01)
(Continued)

(52) U.S. Cl.
CPC ............ *H04L 41/0843* (2013.01); *G06F 8/20* (2013.01); *H04L 41/0806* (2013.01)

(58) Field of Classification Search
CPC ... H04L 41/0843; H04L 41/0806; G06F 8/20; G06F 9/5072; G06F 8/71; G06F 8/76; G06F 11/36
(Continued)

(56) References Cited

U.S. PATENT DOCUMENTS 8,667,138 B2 * 3/2014 Ganesan ............... G06F 9/5072
709/224
10,521,286 B2 * 12/2019 Arumugam ............... G06F 9/54
(Continued)

FOREIGN PATENT DOCUMENTS

CN 109347663 A 2/2019
CN 110704164 A 1/2020
(Continued)

OTHER PUBLICATIONS

International Searching Authority. International Search Report and Written Opinion for PCT Application No. PCT/CN2022/091530 and English translation, mailed Aug. 3, 2022, pp. 1-10.
(Continued)

*Primary Examiner* — Kenneth R Coulter
(74) *Attorney, Agent, or Firm* — Vivacqua Crane, PLLC

(57) ABSTRACT

An architecture, a method and a device for managing cloud platform, and a computer-readable storage medium are disclosed. The architecture may include a first management device, configured to define at least one application capability based on an open application model, where each application capability is indicative of a workload supported by a cloud platform or an operation and maintenance trait acting on the workload; a second management device connected to the first management device, and is configured to determine a capability boundary corresponding to the application capability from the first management device according to the application capability; and an application orches-
(Continued)

tration and instantiation device connected to the first management device, and is configured to determine for each of the at least one candidate cloud platform, a strategy for an application orchestration and instantiation according to the capability boundary.

20 Claims, 8 Drawing Sheets

(51) Int. Cl.
    *H04L 41/0806*       (2022.01)
    *H04L 41/084*        (2022.01)

(58) Field of Classification Search
    USPC ............... 709/226, 225, 222, 223, 220, 221;
                   718/106, 104, 102, 100
    See application file for complete search history.

(56) References Cited

U.S. PATENT DOCUMENTS

| | | | |
|---|---|---|---|
| 11,385,938 B2 * | 7/2022 | Kim | H04L 43/0817 |
| 12,020,082 B2 * | 6/2024 | Khire | H04L 41/22 |
| 2012/0110185 A1 * | 5/2012 | Ganesan | G06F 9/5072 |
| | | | 709/226 |
| 2018/0276060 A1 | 9/2018 | Arumugam | |
| 2019/0082004 A1 | 3/2019 | Bosch et al. | |
| 2019/0281112 A1 | 9/2019 | Bhat et al. | |
| 2020/0218580 A1 | 7/2020 | Kim et al. | |
| 2023/0289236 A1 * | 9/2023 | Khire | G06F 9/5072 |
| 2024/0036929 A1 * | 2/2024 | Moyes | G06F 9/5072 |
| 2024/0256251 A1 * | 8/2024 | Vergara | G06F 8/60 |
| 2024/0256297 A1 * | 8/2024 | Dhruvakumar | G06F 9/44594 |
| 2024/0345830 A1 * | 10/2024 | Vergara | G06F 8/71 |

FOREIGN PATENT DOCUMENTS

| | | |
|---|---|---|
| CN | 112799789 A | 5/2021 |
| JP | 2022095016 A | 6/2022 |
| WO | 2022130708 A1 | 6/2022 |

OTHER PUBLICATIONS

Industrial Property Cooperation Center (IPCC). Search Report for JP Application No. 2024-505368 and English translation, mailed Dec. 2, 2024, pp. 1-39.

Japan Patent Office. Notice of Reasons for Refusal for JP Application No. 2024-505368 and English translation, mailed Dec. 2, 2024, pp. 1-6.

Ohwada, K. "How to Use OAM to Upgrade Your Unified Application Management Architecture," Qiita, May 19, 2021, https://qiita.com/KentOhwada_AlibabaCloudJapan/items/872458f4fc1d7040a359.

European Patent Office. Extended European Search Report for EP Application No. 22854983.8, mailed Apr. 8, 2024, pp. 1-11.

Luong, D., et al. "Predictive Autoscaling Orchestration for Cloud-native Telecom Microservices," 2018 IEEE 5G World Forum, Jul. 2018, pp. 153-158.

Warke, A., et al. "Storage Service Orchestration with Container Elasticity," 2018 IEEE 4th International Conference on Collaboration and Internet Computing, pp. 283-292.

* cited by examiner

| Fourth Cloud Platform | | | Fifth Cloud Platform | | | Sixth Cloud Platform | | |
|---|---|---|---|---|---|---|---|---|
| 1ST Core Capability | 2ND Core Capability | | 1ST Core Capability | 2ND Core Capability | | 1ST Core Capability | 2ND Core Capability | |
| 3RD Core Capability | 1ST Standard Capability | | 3RD Core Capability | 1ST Standard Capability | | 3RD Core Capability | 1ST Standard Capability | |
| 2ND Standard Capability | 3RD Standard Capability | | 2ND Standard Capability | 3RD Standard Capability | | 2ND Standard Capability | 3RD Standard Capability | |
| 1ST Extended Capability | 2ND Extended Capability | | 1ST Extended Capability | 4TH Extended Capability | | 6TH Extended Capability | 7TH Extended Capability | |
| 3RD Extended Capability | 4TH Extended Capability | | 5TH Extended Capability | | | 9TH Extended Capability | | |

Preset Capability Set

FIG. 3

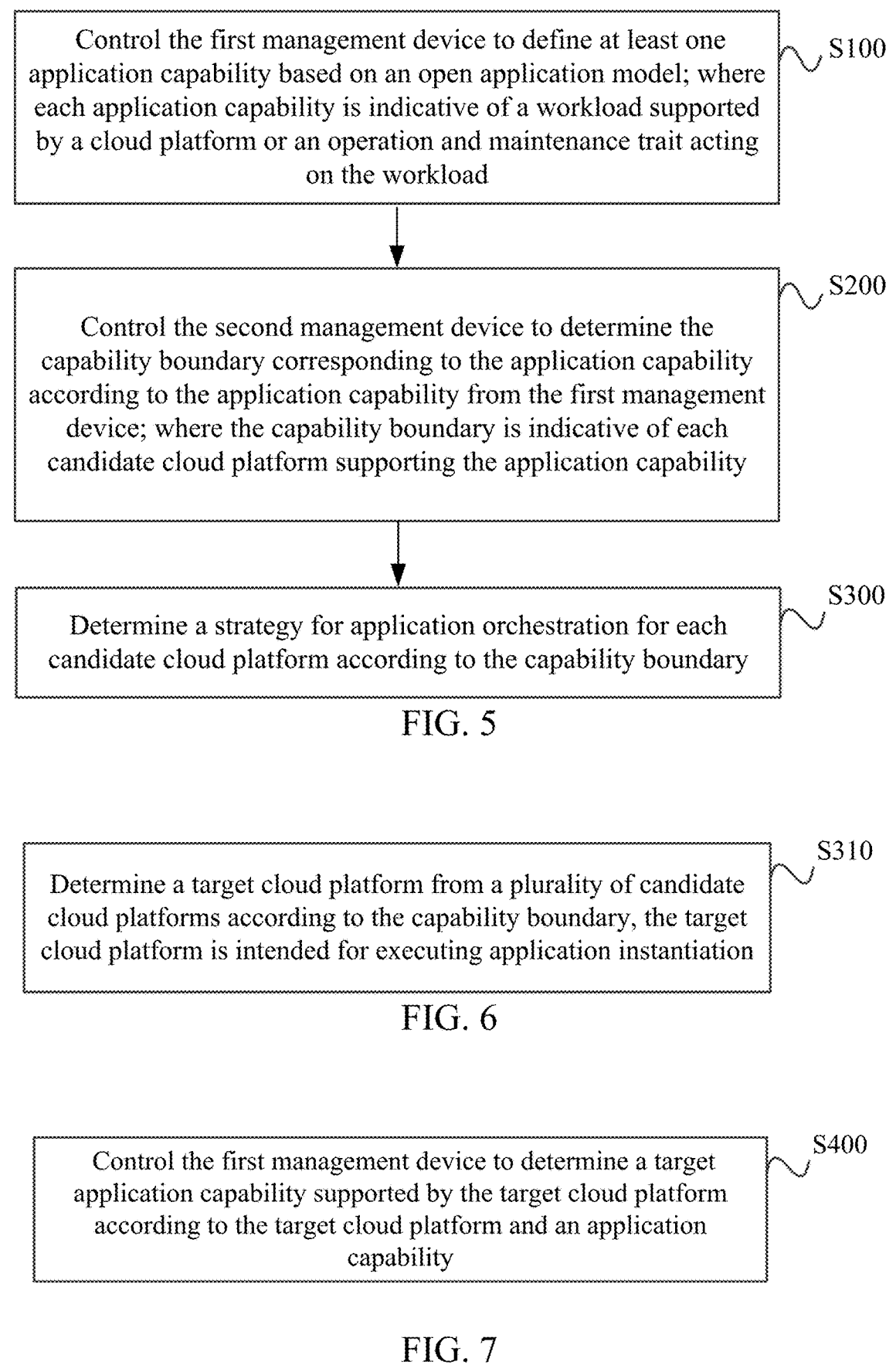

Control the first management device to define at least one application capability based on an open application model; where each application capability is indicative of a workload supported by a cloud platform or an operation and maintenance trait acting on the workload    S100

Control the second management device to determine the capability boundary corresponding to the application capability according to the application capability from the first management device; where the capability boundary is indicative of each candidate cloud platform supporting the application capability    S200

Determine a strategy for application orchestration for each candidate cloud platform according to the capability boundary    S300

FIG. 5

Determine a target cloud platform from a plurality of candidate cloud platforms according to the capability boundary, the target cloud platform is intended for executing application instantiation    S310

FIG. 6

Control the first management device to determine a target application capability supported by the target cloud platform according to the target cloud platform and an application capability    S400

FIG. 7

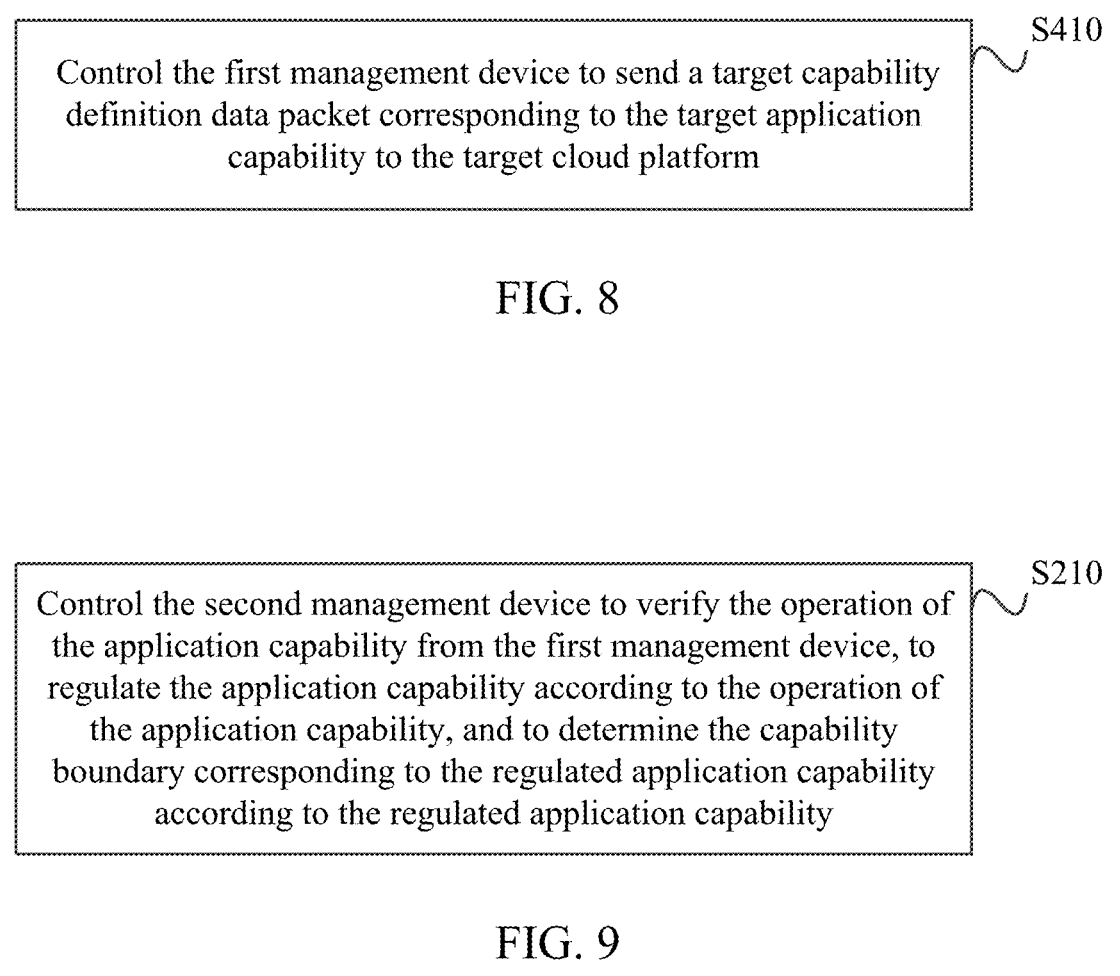

Control the first management device to send a target capability definition data packet corresponding to the target application capability to the target cloud platform ~ S410

FIG. 8

Control the second management device to verify the operation of the application capability from the first management device, to regulate the application capability according to the operation of the application capability, and to determine the capability boundary corresponding to the regulated application capability according to the regulated application capability ~ S210

FIG. 9

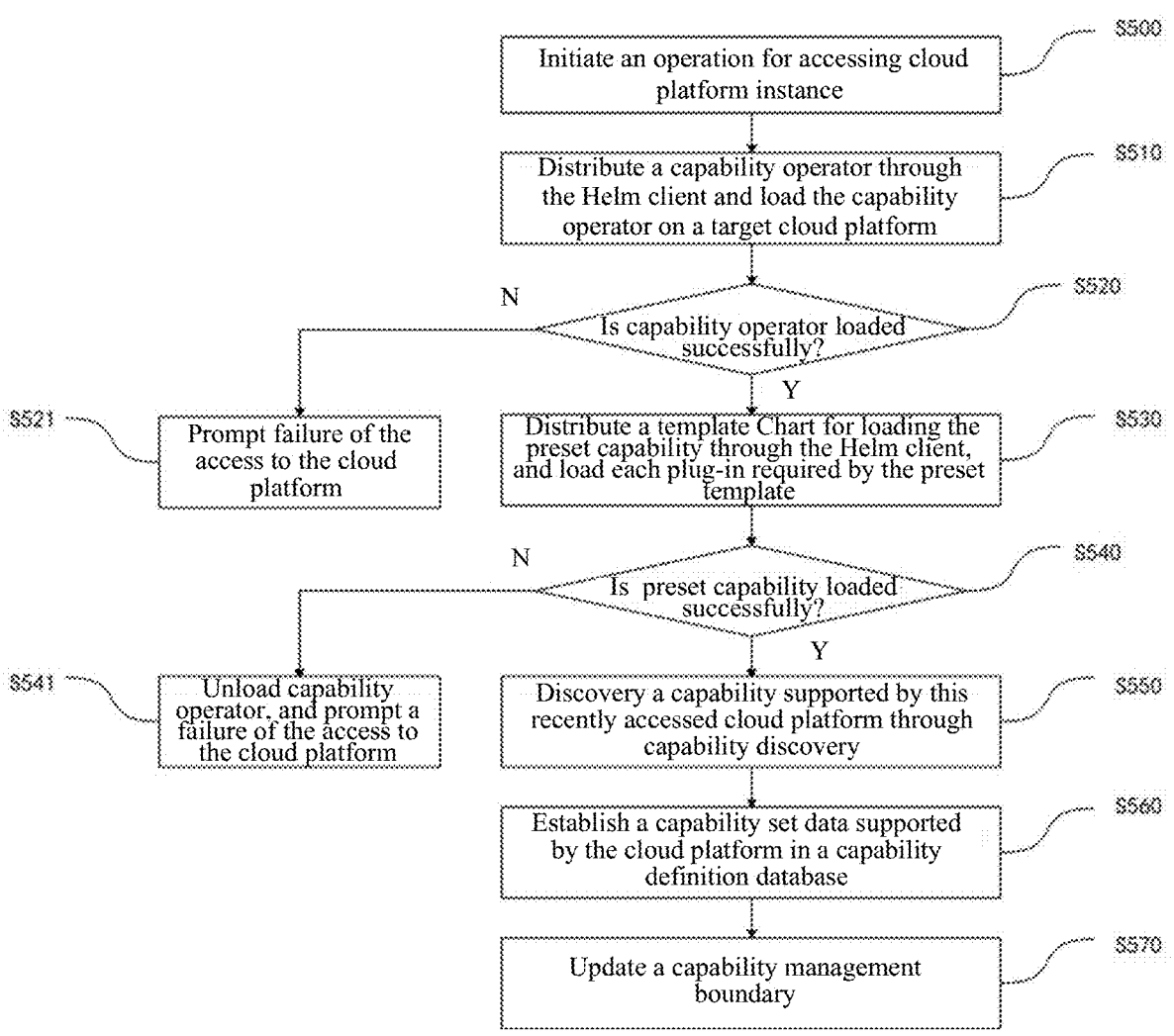

Initiate an operation for accessing cloud platform instance        S500

Distribute a capability operator through the Helm client and load the capability operator on a target cloud platform        S510

N        Is capability operator loaded successfully?        S520

Y

S521        Prompt failure of the access to the cloud platform

Distribute a template Chart for loading the preset capability through the Helm client, and load each plug-in required by the preset template        S530

N        Is  preset capability loaded successfully?        S540

Y

S541        Unload capability operator, and prompt a failure of the access to the cloud platform Discovery a capability supported by this recently accessed cloud platform through capability discovery        S550

Establish a capability set data supported by the cloud platform in a capability definition database        S560

Update a capability management boundary        S570

FIG. 10

ARCHITECTURE, METHOD AND DEVICE FOR MANAGING CLOUD PLATFORM, AND STORAGE MEDIUM

CROSS-REFERENCE TO RELATED APPLICATION

This application is a national stage filing under 35 U.S.C. § 371 of international application number PCT/CN2022/091530, filed May 7, 2022, which claims priority to Chinese patent application No. 202110915014.6 filed Aug. 10, 2021. The contents of these applications are incorporated herein by reference in their entirety.

TECHNICAL FIELD

The present disclosure relates to, but is not limited to, the application field of cloud-native scenes, in particular to an architecture, a method and a device for managing cloud platform, and a computer-readable storage medium.

BACKGROUND

Currently, the application orchestration on a cloud platform is basically coupled to the cloud platform to utilize native resources provided by the cloud platform. Due to the limited types of resources, it is ineffective for the orchestration system to make full utilization of the resources provided by the cloud native ecology, let alone the portability among various cloud platforms. In other words, for application developers, the cloud platform is in a capability dilemma. Most Platform as a Service (PaaS) systems restrict the supported application types and supported functions, which are embodied in inefficiency in extending and creating their own plug-in systems, and in maintaining by their own communities, etc. Hence, this plug-in mechanism can only be a closed small ecological capability exclusive to PaaS systems, and cannot be utilized reliably on a large scale. Moreover, in practice, for the application design of system for managing multi-cloud, the central computer room hosts different cloud platforms, and there are certain differences among different cloud platforms. During the orchestration, the selectable orchestration elements can usually only encapsulate some simple general resources, but the design for different plug-in capabilities of specific cloud platforms are not enabled. As such, the orchestration capability depends entirely on the encapsulation of simple resources, and what fields are exposed depends entirely on the developer's understanding of the application. The update of fields in the later stage, if needed, can only be done by modifying the code and re-versioning, which is very inflexible. At the same time, a large number of plug-ins related to operation and maintenance in the cloud native ecology cannot be utilized, which leads to the inability of the orchestration for complex application features, thus worsening the overall orchestration effect.

SUMMARY

The following is a summary of the subject matter described herein. This summary is not intended to limit the scope of protection of the claims.

Provided are an architecture, a method, and a device for managing cloud platform, and a computer-readable storage medium in some embodiments of the present disclosure.

An embodiment of the present disclosure provides an architecture for managing cloud platform, which may include, a first management device, configured to define at least one application capability based on an open application model, where each application capability is indicative of a workload supported by a cloud platform or an operation and maintenance trait acting on the workload; a second management device; where the second management device is connected to the first management device, and is configured to determine a capability boundary corresponding to the application capability from the first management device according to the application capability; and the capability boundary is indicative of each candidate cloud platform supporting the application capability; and an application orchestration and instantiation device; where the application orchestration and instantiation device is connected to the first management device, and is configured to determine for each of the at least one candidate cloud platform, a strategy for an application orchestration and instantiation according to the capability boundary.

An embodiment of the present disclosure provides a method for managing cloud platform, which is applied to an architecture for cloud platform management that may include a first management device and a second management device connected to the first management device; the method may include, controlling the first management device to define at least one application capability based on an open application model; where each application capability is indicative of a workload supported by a cloud platform or an operation and maintenance trait acting on the workload; controlling a second management device to determine a capability boundary corresponding to the application capability from the first management device according to the application capability; and the capability boundary is indicative of each of the at least one candidate cloud platform supporting the application capability; and determining for each of the at least one candidate cloud platform, a strategy for an application orchestration and instantiation according to the capability boundary.

An embodiment of the present disclosure provides a device for managing cloud platform, which may include a memory, a processor, and a computer program stored in the memory and executable on the processor which, when executed by the processor, causes the processor to carry out the method as described above.

An embodiment of the present disclosure further provides a computer-readable storage medium storing thereon a computer-executable instruction which, when executed by a processor, causes the processor to carry out the method as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

FIG. 3 depicts a schematic diagram showing the capability boundary according to an embodiment of the present disclosure;

FIG. 5 depicts a flowchart showing a method for managing cloud platform according to an embodiment of the present disclosure;

FIG. 6 depicts a flowchart showing the determination of a target cloud platform in the method for managing cloud platform according to an embodiment of the present disclosure;

FIG. 7 depicts a flowchart showing a method for managing cloud platform according to another embodiment of the present disclosure;

FIG. 8 depicts a flowchart showing a method for managing cloud platform according to another embodiment of the present disclosure;

FIG. 9 depicts a flowchart showing the determination of a capability boundary in the method for managing cloud platform according to an embodiment of the present disclosure;

FIG. 10 depicts a flowchart showing the accessing of a cloud platform in the architecture for managing cloud platform according to an embodiment of the present disclosure;

DETAILED DESCRIPTION

The purpose, technical scheme and advantages of the present disclosure will become apparent through the following description for various embodiments in conjunction with the drawings. It should be understood that the embodiments described here are intended for illustration but not limitation of the present disclosure.

It should be noted that although the devices are shown with individual functional modules in the schematic diagram and the logical sequences are shown in the flow chart, in some cases, the devices can have different modules than those shown and the steps can be executed in a different order than those shown. It should be noted that the terms "first" and "second", if used in the description, the claims and the drawings are intended to distinguish similar objects, and do not necessarily imply any specific order or sequence.

Provided are an architecture, a method, and a device for managing cloud platform, and a computer-readable storage medium in some embodiments of the present disclosure. Under the specific scenario of the open application model, a plurality of application capabilities are defined through the first management device, so that it is possible to provide the capability abstraction of the cloud-native applications, thereby matching the differentiated scenarios of each cloud platform, enhancing the portability of the cloud-native applications among the cloud platforms. And the capability boundary of the candidate cloud platform supporting the defined application capabilities is determined through the second management device, to help the application orchestration and instantiation device determine the application orchestration and instantiation strategy for each candidate cloud platform through the capability boundary, so as to manage the differentiated scenarios of multiple cloud platforms and achieve the effect of optimizing the application orchestration and instantiation.

Some embodiments of the present disclosure will be further illustrated with reference to the drawings.

Figure 1:
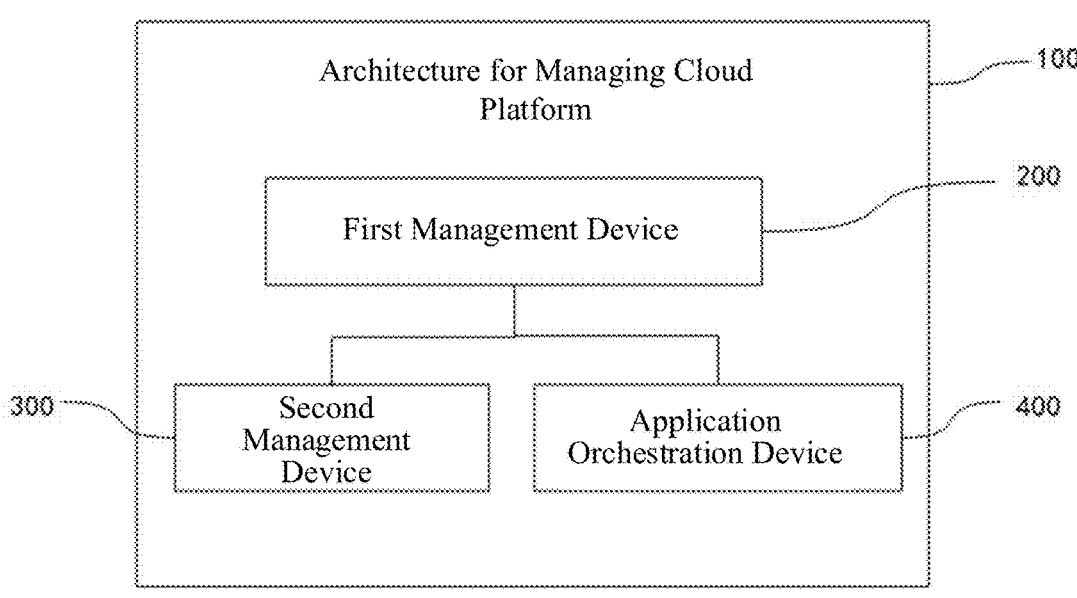
FIG. 1 depicts a schematic diagram showing an architecture for managing cloud platform according to an embodiment of the present disclosure.

FIG. 1 depicts a schematic diagram showing an architecture 100 for managing cloud platform according to an embodiment of the present disclosure.

As shown in FIG. 1, the architecture 100 may include, but is not limited to, a first management device 200, which is configured to define at least one application capability based on an open application model, and each application capability is indicative of a workload supported by a cloud platform or the operation and maintenance trait acting on the workload.

The cloud platform applied by the architecture 100 in an embodiment of the present disclosure can take cloud infrastructure as the core, and can run on standardized hardware facilities and enhanced and customized hardware devices. The cloud platform can provide externally single or mixed resource services based on virtual machines, bare machines and containers, and can integrate and provide technical components, networks and services, and can also be expanded on demand to provide cloud-native technology stack for multiple products.

In an embodiment, the standardized hardware facilities and enhanced and customized devices mentioned above include but are not limited to general servers, storages, network devices, customized all-in-one machines, smart network cards, acceleration hardware, etc.

In an embodiment of the present disclosure, the cloud platform can be a container cloud platform based on the K8S platform, or a dual-core cloud platform based on the K8S and Openstack, and it is not intended to specifically limit the types of the cloud platform in the present disclosure.

In an embodiment, the Open Application Model (OAM) is a standard specification for building and delivering cloud-native applications. Compared with the traditional platforms, such as the PaaS, which is closed and it is not possible to connect with the cloud-native ecology based on the capability operator, the modern cloud-native application management platform based on OAM and the K8S is essentially an "application-centric" K8S, which ensures that the application platform can seamlessly access the whole cloud native ecology. Meanwhile, OAM can further eliminate the complexity and diversity of container infrastructure, and bring low-burden, standardized and consistent application management and delivery experience to users of the cloud platform.

In various embodiments of the present disclosure, the application capability can refer to, but is not limited to, the atomization function that can form a complete application, and can be regarded as the capability abstraction provided by the cloud platform for the application definer, which is mainly expressed as the supported workloads or the operation and maintenance trait acting on these workloads. With the support of these capabilities, the application definers can define cloud-native applications that meet business requirements.

In particular, a workload includes but is not limited to a function, a container, a cloud resource, a virtual machine, or the like. The workload is intended to describe how to run an application. Operation and maintenance traits include, but are not limited to, traffic management, publishing strategy, flexibility strategy, observability strategy, or the like. Finally, the cloud platform can provide differentiated scenarios for end users through different combinations of workload and operation and maintenance trait, and help users define cloud-native applications.

In an embodiment, the application capability is defined by means of a standard template with reference to the application capability definition method agreed in the open application model specification.

In an embodiment, the application capability is classified into workload capability and trait capability. The workload capability can be defined in a standard template of the open application model specification, such as core.oam.dev/v1alpha2.WorkloadDefinition of oam-kubernetes-runtime. Trait capability can be defined by core.oam.dev/v1alpha2.TraitDefinition of oam-kubernetes-runtime. It can be understood that, both workload definition and trait definition are custom resource definitions (CRDs) of K8S, so the capability definition can be obtained from the cloud platform through CRD type.

In particular, with reference to the open application model, and according to the application capability characteristics, a workload type can include a core workload type, a standard workload type, and an extended workload type. A trait capability scope can include a core trait scope, a standard trait scope, and an extended trait scope.

Among them, the capability of the core trait scope is a predefined capability of the open application model. The capability of standard trait scope is the application capability that can be realized by the device in an embodiment of the present disclosure, and which can be supported to run on most cloud platforms in practical applications. The capability of the extended trait scope is based on the application capability developed by the cloud platform users targeted by the device in an embodiment of the disclosure, which can dock the cloud platform ecology and develop various application abilities required by application definition by means of various plug-ins widely existing in the open-source community. Under normal circumstances, the application capabilities of core trait scope and standard trait scope are not modified, and the application capability of extended trait scope can be updated at any time and take effect dynamically.

In an embodiment, the workload capability on the K8S cloud platform can be defined by the reference to K8S predefined resources or CRD definitions, i.e., the workload capability can be defined by yaml files. If a new CRD is to be introduced, corresponding capability executors or bottom-level dependent plug-ins shall be added. If the trait capability needs the support from bottom-level plug-ins, corresponding capability executors and bottom-level plug-ins can also be added as needed, where the capability definition supports the definition of leading actions to load these capability executors and plug-ins.

In an embodiment, the application capability definition itself can be expressed by JavaScript Object Notation (JSON). In addition, the application capability definition can also be developed by means of a template language, including but not limited to CUELang or Helm.

It should be noted that the first management device 200 is further configured to determine the target application capability supported by the target cloud platform according to the target cloud platform and the application capability, and is configured to send a target capability definition data packet corresponding to the target application capability to the target cloud platform.

In an embodiment, when a cloud platform is included in the management scope of the first management device 200, the first management device 200 can actively discover the capability set supported by this cloud platform. Since the application capability is defined by the specification of the open application model, all workload definition and trait definition examples can be queried through the K8S native interface, and detailed information such as the description of the corresponding application capability and the scope of action can be obtained.

In an embodiment, the application capabilities discovered by the first management device 200 will persist in the database of the first management device 200, thus forming a table to store the corresponding relationship between the cloud platforms and capabilities, and finally forming the respective capability sets of multiple cloud platforms managed by the first management device 200.

It should be noted that for different cloud platform instances, their capability sets can be identical or different.

In an embodiment, the first management device 200 can support the capability types defined by the open application model specification, and support the predefined capability set. Such a predefined capability can be supported by most cloud platforms by default, such as the capabilities corresponding to the predefined resource types through K8S.

In an embodiment, the first management device 200 provides capability definition specifications, employs a capability database to maintain various capabilities, provides a variety of predefined capabilities, provides users with the capability to load secondary development and imports cloud native community definitions, all of the capability definitions are persisted in the capability database. Meanwhile, with the access of cloud platform instances, capabilities are discovered and distributed for each cloud platform, while the device establishes the corresponding relationship between each capability and the managed cloud platform instances in the capability database to determine the capability set supported by each cloud platform. The embodiment of the present disclosure also supports the remote capability warehouse, and various capabilities contributed by the open-source community can be placed in the capability warehouse. By the arrangement of the remote capability warehouse, the cloud-native ecology can be seamlessly connected.

When a cloud platform is managed by the first management device 200, firstly, it is necessary to ensure that the cloud platform has a capability operator, where the capability operator is configured to process the defined application capability, and its specifications and contents can be selected according to the situation, and if the capability operator does not exist, the capability operator is distributed in a cloud-native way. When accessing the cloud platform, the first management device 200 sends various preset capabilities to the target cloud platform, so that the cloud platform has corresponding capabilities. Because the capability definitions are K8S CRD, these capability definitions can be distributed in a K8S native way.

At the same time, the platform developer can define more capabilities through the specification of the open application model, bring them into the management of the first management device 200, and assign and distribute them to the corresponding cloud platform. It is also possible to employ various open-source capabilities in the K8S ecosystem in the cloud native community to import them into the first management device 200, so that the management capabilities of the first management device 200 are continuously expanded. In addition, if the existing capability definition has changed, the capability definition can be re-distributed, and updated on the corresponding cloud platform.

It should be noted that if the capability definition package required by application definition and its dependent plug-in package already exist in this device, the capability definition package can be selected and distributed to the corresponding cloud platform system for loading when the application is instantiated.

Referring to FIG. 1, the architecture 100 for managing cloud platform in an embodiment of the present disclosure further includes a second management device 300. The second management device 300 is connected to the first management device 200 and is configured to determine the capability boundary corresponding to the application capability according to the application capability from the first management device 200. The capability boundary is indicative of each candidate cloud platform supporting the application capability.

Specifically, the capability boundary refers to the scope of cloud platform instances that support a specific capability definition. The capability boundary is closely related to the capability type and depends on the capability set supported by a cloud platform. For example, for the preset K8S platform capability, the scope of action is all K8S-type cloud platforms. For a secondary development defined capability or an imported cloud native community defined capability, the scope of action is a cloud platform instance that explicitly distributes this capability, or the cloud platform instance that has installed this capability on the cloud platform.

It should be noted that the second management device 300 is configured to verify the operation of the application capability from the first management device 200, regulate the application capability according to the operation of the application capability, and determine the capability boundary corresponding to the regulated application capability according to the regulated application capability.

In addition, the capability definition itself involves various operations on cloud platform resources, plug-ins, etc., and has a certain degree of complexity. It is necessary to consider the process like the development, testing and launch. Through the Webhook mechanism of K8S, it is necessary to verify the capability definition, verify the validity of yaml document of the capability definition, verify the validity of the template language of the capability definition, and verify the degree of satisfaction of the resources and the underlying plug-in on which the capability definition depends.

The second management device 300 further provides a capability testing sandbox, which simulates and tests the newly-launched capability and assists in analyzing the test output to ensure that the capability development meets the needs of users. The capability sandbox is a capability simulation operation environment, which is isolated from the production environment. Many capabilities-related logics are executed in simulation, and the real resource operation actions are not executed, which can simulate the practical operation effect of the capability to a certain extent, and assist the capability developers in determining the logic correctness according to the output. After the sandbox pre-test passes, the capability can be loaded into the formal cloud environment to provide services. And in the capability definition upgrade scenario, it is also possible to provide testing capability through webhook. At first, some capability creation requests are diverted to the implementation of the new version of the capability definition, and gradually replace the old version with the new version according to the implementation effect.

Referring to FIG. 1, the architecture 100 for managing cloud platform according to an embodiment of the present disclosure further includes an application orchestration device 400. The application orchestration device 400 is connected to the first management device 200 and is configured to determine the application orchestration strategy for each candidate cloud platform according to the capability boundary.

It should be noted that the traditional application orchestration system basically adopts the hard-coded scheme, which realizes the hard-coded orchestration interface according to the specific cloud platform resource type, however the defined application is not portable due to the lack of scalability of the traditional system, so the traditional system cannot cope with the differentiated management of the multi-cloud platform capabilities. Compared with the traditional hard-coded application orchestration system, the application orchestration device 400 according to an embodiment of the present disclosure can flexibly apply the capability elements, dynamically generate the application orchestration elements according to the capability template definitions in the capability definition database, and allow the application definers to use the orchestration elements correspondingly according to the capability boundaries. At the same time, according to the constantly introduced new capability definitions, the orchestration capability of the device to support application definitions is continuously improved, and the cloud native ecology is utilized more effectively.

It should be noted that the application orchestration device 400 according to an embodiment of the present disclosure is configured to determine a target cloud platform for executing application instantiation from each of the candidate cloud platforms according to the capability boundary.

When orchestrating applications, a user can select preset capability definition elements. Meanwhile, various extended capability definitions can be utilized by means of the capability boundary according to the selected cloud platform instance, or the capability boundary can be ignored first, and all the capability definitions managed by the application orchestration device 400 can be utilized, and then the capability boundary will be acted upon when the application is instantiated.

The application definition generated according to an embodiment of the present disclosure can be packaged into a CHART package through Helm for execution of instantiation.

When instantiating an application, it is necessary to perform the actions defined by the capability. The capabilities defined in the present disclosure are provided by K8S CRD, and the corresponding capabilities CRD needs to be executed by the capability operator. The capability operator needs to provide the corresponding controller to realize the relevant logic. For the workload capability, the capability operator transforms the capability defined by CRD into the native resource of the cloud platform or user-defined resource according to the capability reference definition. And for trait capability, the operator executes the corresponding logic according to the capability template definition, and may even rely on the assistance of another operator or controller and underlying plug-ins on the cloud platform.

In an embodiment of the present disclosure, during the orchestration of the blueprint and the instantiation of the application, the cloud platform instance supporting this application can be selected according to the capability boundary. Under the corresponding conditions, it is also possible to choose to actively distribute the required capabilities of this application to the target cloud platform to empower the cloud platform and create application running conditions. The ultimate goal is to ensure that the defined application can be instantiated normally on the cloud platform and ensure the portability of the application between different cloud platforms.

It can be understood that the architecture 100 for managing cloud platform according to an embodiment of the present disclosure further includes a capability database configured to store at least one capability template corresponding to at least one application capability. The capability database is connected to the application orchestration device 400 through the first management device 200. The application orchestration device 400 is further configured to generate a programmable application capability orchestration element according to the capability template from the capability database, and the application capability orchestration element corresponds to the capability template.

The cloud platform capability template managed by the first management device 200 will be eventually persisted into the capability database, so as to provide on-going management of the capabilities to subsequently generate an orchestration interface according to the capability data. At the same time, the capability database provides interfaces for registering, querying, updating and deleting capability definition templates.

For example, Get {apiRoot}/app_1 cm/v2/capabilities defines the interface for querying all the capability template definitions on the cloud platform. For another example, GET {apiRoot}/app_1 cm/v2/capabilities/:id defines the interface for querying the capability template information of the specified ID on the cloud platform. For another example, 3.POST {apiRoot}/app_1 cm/v2/capability defines the interface for submitting user-defined capability templates to the cloud platform.

In an embodiment, the application orchestration device 400 can present all preset capabilities during orchestration, because the capability boundary of the device is the complete set of the cloud platform. At the same time, if one or more cloud platform instances where the defined application runs later can be made clear during the orchestration, the intersection of the capabilities of these cloud platform instances can be taken for utilization by the definer, so that the defined application can be instantiated in the target cloud platform normally.

In addition, it is not necessary to focus on the differences in the capability sets of various cloud platforms during the application orchestration, because some cloud platforms may be managed by the first management device 200 later, and in addition, it is also possible to actively install various capabilities on cloud platform instances after being included in the first management device 200. Therefore, the user can select all the capability types managed by the first management device 200 according to his own needs. During instantiation, candidate target cloud platform instances can be filtered according to the capability boundary. Only the cloud platform instances that support the capability boundary corresponding to all the capabilities required by this application are filtered out, for users to choose. In this way, it also effectively ensures the normal instantiation of the application in the target cloud platform.

In an embodiment, the first management device 200 can further extend the capability set of the cloud platform instance and extend the capability boundary of some capabilities. If the corresponding capability definition package and the plug-in package on which the capability definition package depends are present in the first management device 200, it is possible to choose to distribute the capability definition package to the corresponding cloud platform for installation, so as to empower the cloud platform and enable the cloud platform to support the deployment of applications that were not originally supported.

Therefore, in an embodiment of the present disclosure, a plurality of application capabilities are defined through the first management device 200 under the specific scenario of the open application model, so that it is possible to provide the capability abstraction of the cloud-native applications, thereby matching the differentiated scenarios of each cloud platform, enhancing the portability of the cloud-native applications among the cloud platforms. And the capability boundary of the candidate cloud platform supporting the defined application capabilities is determined through the second management device 300, to help the application orchestration device 400 determine the application orchestration strategy for each candidate cloud platform through the capability boundary, so as to manage the differentiated scenarios of multiple cloud platforms and achieve the effect of optimizing the application orchestration.

Some example embodiments are provided below in order to illustrate the operating principles of the above embodiments with more details.

Example Embodiment One

Figure 2:
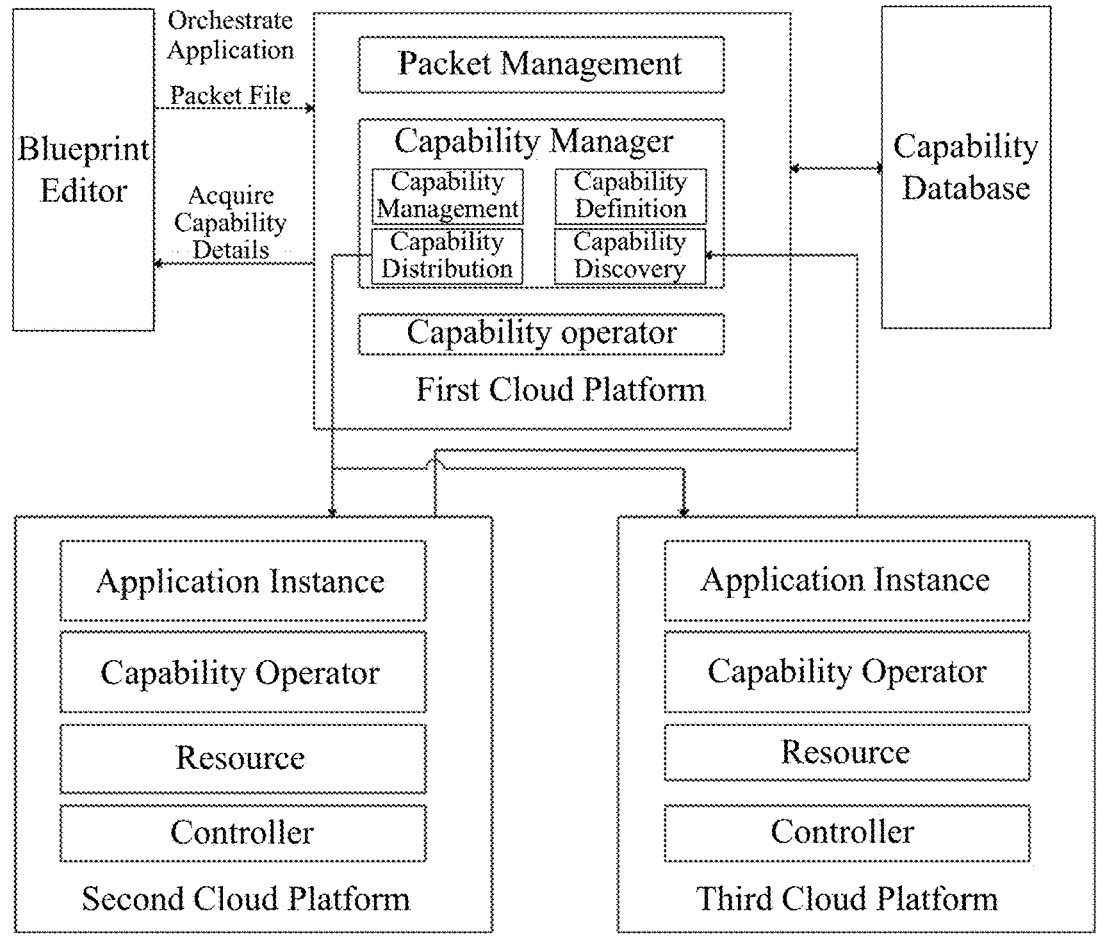
FIG. 2 depicts a schematic diagram showing an architecture for managing cloud platform according to an example embodiment of the present disclosure.

FIG. 2 depicts a schematic diagram showing an architecture for managing cloud platform according to an example embodiment of the present disclosure.

In the embodiment as shown in FIG. 2, the first cloud platform includes a capability manager and a capability operator. The capability manager is a capability management control plane, and is configured for capability management. The capability operator is the capability management data plane, and is configured for capability loading, execution and application package instantiation, such as for application instances in the second and third cloud platforms. At the same time, the first cloud platform also has the data plane function.

In particular, the capability management control plane provides the capability definition by referring to the capability definition scheme agreed in the open application model specification and adopting the standard template. The elements supporting application definition are abstracted through capabilities, and the capability scope of each cloud platform is defined through differentiated management of capabilities on multiple lower-level cloud platforms. The capabilities on each cloud platform are persisted in the capability definition database, so as to finally provide complete capability management. When accessing the lower-level cloud platform, the preset capability and the user-defined extended capability set are sent to the target cloud platform to provide capability distribution. All the details of workload definition and trait definition are inquired through K8S, and the detailed information such as corresponding capability description and scope of action are acquired, thus providing the capability discovery of the multi-cloud platform.

The capability management control plane distributes and loads the capability operators for the data plane when accessing the lower-level cloud platforms, so that the lower-level cloud platforms have the capability to verify the validity of the capability definition template language and the satisfaction of the dependency on cloud platform resources and underlying plug-ins when receiving the capability template definition distributed by the control plane. At the same time, the capability operator provides a capability testing sandbox module to simulate and test the recently-launched capability and assist in analyzing the test output, so as to ensure that the capability development meets the user's needs and finally loads the capability successfully. In addition, the capability operator provides the capability to test the upgrade scenario of capability definition, diverts some capability creation requests to the new version of capability definition implementation, and gradually replaces the old version with the new version according to the implementation effect. The blueprint orchestrator is configured to obtain the capability template definition in the capability definition database from the capability management control plane, dynamically generate application orchestration elements, and allow the application definer to flexibly select orchestration elements according to the capability boundary. The orchestrator is utilized by a user to publish an application package file to the control plane. During instantiation, the control plane determines the cloud platform that can be deployed according to the capability boundary, and distributes an application package to a lower-level cloud platform. After receiving the blueprint orchestrated application package, the lower-level cloud platform converts each capability employed by the application definition into the CRD and K8S native resources of the cloud platform through the capability operator of the data plane, thus instantiating the application package.

Example Embodiment Two

FIG. 3 depicts a schematic diagram showing the capability boundary according to an embodiment of the present disclosure.

As shown in FIG. 3, the capabilities are divided into three categories according to the capability features of operation and maintenance and workload, i.e., the core capability (CC), standard capability (SC), and extended capability (EC).

In particular, CC is the predefined capability of the open application model. SC is the capability of default implementation of the architecture for managing cloud platform according to an embodiment of the present disclosure, and can support running on most cloud platforms. EC is a capability secondarily developed by users of the cloud platform based on the architecture for managing cloud platform according to an embodiment of the present disclosure, and which can connect with the cloud platform ecology and utilize various plug-ins widely existing in the open source community to develop various capabilities required for application definition. CC and SC capabilities are not allowed to be modified, but EC can be updated and take effect dynamically.

Therefore, in terms of multiple cloud platforms, the CC and SC of each platform are identical. That is, in FIG. 3, each of the fourth cloud platform, the fifth cloud platform and the sixth cloud platform has the identical first core capability, the identical second core capability, and the identical third core capability. In an embodiment of the present disclosure, the complete set of CC and SC is called the preset capability set, and the capability boundary thereof is all cloud platforms, which are the fourth cloud platform, the fifth cloud platform and the sixth cloud platform shown in FIG. 3.

In addition, because EC is generally secondary developed by users, different cloud platforms may have different or identical EC in practical operation according to the distribution situation of users and the different infrastructures of cloud platforms. Therefore, in terms of capability boundaries, different ECs may have identical or different capability boundaries. Take FIG. 3 as an example: the capability boundaries of both the first and fourth extended capabilities are the fourth cloud platform and the fifth cloud platform; the capability boundary of both the second extended capability and the third extended capability is the fourth cloud platform; the capability boundary of the fifth extended capability is the fifth cloud platform; the capability boundary of the sixth extended capability, the seventh extended capability and the ninth extended capability is the sixth cloud platform.

Example Embodiment Three

Figure 4:
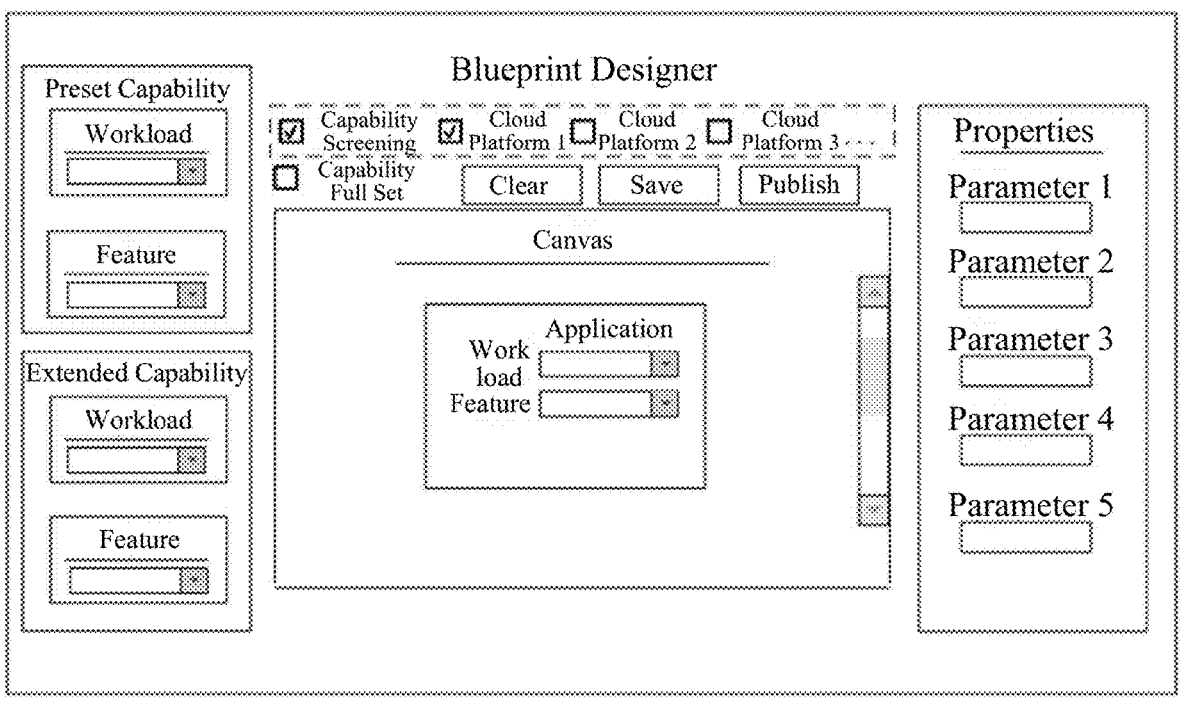
FIG. 4 depicts a schematic diagram showing an interface of a blueprint designer according to an embodiment of the present disclosure.

FIG. 4 depicts a schematic diagram showing an interface of a blueprint designer according to an embodiment of the present disclosure. As shown in FIG. 4, the blueprint designer includes an orchestration element column, a capability screening selection box and a capability full set selection box for single selection, attribute input boxes, a canvas and necessary buttons.

The orchestration element column on the left mainly presents various capabilities supported by the architecture for managing cloud platform according to an embodiment of the present disclosure, including preset capabilities and extended capabilities, that is, the elements required for application definition.

Capability screening supports specifying the cloud platform where the package can be deployed according to the capability boundary when programming the application packages. When the capability screening selection box is selected, the capability screening column lists all the lower-level cloud platforms accessed by the architecture for managing cloud platform according to an embodiment of the disclosure for selection, and according to the selection, the extended capability section of the orchestration element column shows the intersection of all the extended capability sets of the selected cloud platforms. The application of this scenario orchestration can be directly instantiated on these selected cloud platforms, since all the required capabilities are already supported.

Also, the blueprint designer supports programing packages without specifying a cloud platform based on capability boundaries, i.e., the capability full set selection box. When the capability full set selection box is checked, the architecture for managing cloud platform according to an embodiment of the present disclosure shows the union of all cloud platform extended capability sets in the extended capability section of the capability selection column, and the application definition can maximize the management capability of the architecture for managing cloud platform according to an embodiment of the present disclosure. Its capability boundary acts in deploying applications utilizing this package.

Finally, when a specific capability definition is selected in the canvas of the blueprint designer, the designer dynamically displays the editable capability definition parameters in the property column according to the capability definition in the capability definition database.

The following is the process of defining an application by means of an embodiment of the present disclosure. For example, to define a virtual Content Delivery Network (vCDN) content service application (App) of a 5G edge service, the general feature of the App includes running in a container, exposing web services externally, supporting scaling, etc. Service feature includes the appropriate edge routes to be set.

The pre-action includes accessing various edge clouds to support the operation of vCDN App, and the capabilities of these edge clouds are discovered and included in the architecture of managing cloud platform according to an embodiment of the present disclosure, such as the specific capabilities of supporting edge application diversion.

The orchestration process includes the following.

The application blueprint orchestrator of the architecture for managing cloud platform of an embodiment of the present disclosure is opened to start defining the application. The edge cloud platform on which the vCDN App may run can be selected by means of the capability selector. The blueprint orchestrator presents the orchestration element column based on the capability database and capability boundaries. The orchestration elements include general purposed capabilities, such as container workloads, and scaling feature, as well as edge cloud-specific capabilities and extended capabilities, such as the diversion capability. According to the needs of vCDN App, the container workload, the scaling feature, ingress capability and diversion capability of the orchestrator are dragged to the canvas to define the application. For a specific capability, it is possible to set the corresponding attributes on the rightmost side of the orchestrator according to the capability definitions. At the same time, the user needs to upload the service container image, and correspondingly configure the image name in the image attribute of the container workload. After defining the vCDN App, click the "save" button and the App blueprint (i.e., the user-defined application) is thus ready to be published.

In an embodiment, the blueprint of vCDN App can be selected, and a specific cloud platform can be selected to implement application instantiation, and finally the App can be deployed on the specified edge cloud. The App can modify the traffic rules, divert the content service requests on the edge side to the APP, and can cache various content information to serve users nearby. At the same time, this App provides a management interface for operation and maintenance users through Ingress.

To sum up, compared with the traditional application orchestration systems most of which are hard-coded and not extensible, and whose defined applications are not portable, and cannot cope with the differences in capabilities of the multi-cloud platforms, the architecture for managing cloud platform based on an embodiment of the present disclosure can flexibly apply capability elements, dynamically generate application orchestration elements according to the capability template definitions in the capability definition database, and allow application definers to flexibly select the orchestration elements according to the capability boundary. At the same time, according to the continuous introduction of new capability elements, the architecture for managing cloud platform of an embodiment of the present disclosure continuously improves the orchestration capability of supporting application definitions, and makes more effective utilization of the cloud native ecology. In other words, in view of the dilemma of application definition capability on the existing cloud platform, the cloud platform capabilities are defined by means of the open application model and the mature cloud native ecology in an embodiment of the present disclosure, and the operations such as corresponding management of capabilities, classification of capability types and provision of preset capabilities are explicitly proposed. Especially in multi-cloud scenes, the application definition capabilities supported by each cloud platform are actively discovered, such as application workload, operation and maintenance trait, while the development of various application capabilities based on various existing plug-ins of the cloud platforms are supported. The application capabilities are centrally distributed over each of the platforms, and the platforms are thus empowered. It should be noted that the concept of capability boundary is proposed in the present disclosure, which is intended for managing the capability differences among the cloud platforms. Also, an application orchestration interface is dynamically generated based on the application capabilities and capability boundary, which can assist application developers to orchestrate and deploy application blueprints on multi-cloud platforms to further optimize the application orchestration effect.

Based on the above-described architecture for managing cloud platform, some embodiments of the method for managing cloud platform are provided.

FIG. 5 depicts a flowchart showing a method for managing cloud platform according to an embodiment of the present disclosure, which can be applied to the architecture for managing cloud platform as shown in FIG. 1. The method includes but is not limited to operations S100 to S300.

At operation S100, the first management device is controlled to define at least one application capability based on an open application model; where each application capability is indicative of a workload supported by a cloud platform or an operation and maintenance trait acting on the workload.

At operation S200, the second management device is controlled to determine the capability boundary corresponding to the application capability according to the application capability from the first management device; where the capability boundary is indicative of each candidate cloud platform supporting the application capability.

At operation S300, a strategy for application orchestration is determined for each candidate cloud platform according to the capability boundary.

Under the specific scenario of the open application model, a plurality of application capabilities are defined through the first management device, so that it is possible to provide the capability abstraction of the cloud-native applications, thereby matching the differentiated scenarios of each cloud platform, enhancing the portability of the cloud-native applications among the cloud platforms. And the capability boundary of the candidate cloud platform supporting the defined application capabilities is determined through the second management device, to help the application orchestration device determine the application orchestration strategy for each candidate cloud platform through the capability boundary, so as to manage the differentiated scenarios of multiple cloud platforms and achieve the effect of optimizing the application orchestration.

In an embodiment, the first management device provides capability definition specifications, employs a capability database to maintain various capabilities, provides a variety of predefined capabilities, provides users with the capability to load secondary development and imports cloud native community definitions, all of the capability definitions are persisted in the capability database. Meanwhile, with the access of cloud platform instances, capabilities are discovered and distributed for each cloud platform, while the device establishes the corresponding relationship between each capability and the managed cloud platform instances in the capability database to determine the capability set supported by each cloud platform. The embodiment of the present disclosure also supports the remote capability warehouse, and various capabilities contributed by the open-source community can be placed in the capability warehouse. By the arrangement of the remote capability warehouse, the cloud-native ecology can be seamlessly connected.

In an embodiment, the capability definition itself involves various operations on cloud platform resources and plug-ins, and has a certain degree of complexity. It is necessary to consider the process like the development, testing and launch. Through the Webhook mechanism of K8S, it is necessary to verify the capability definition, verify the validity of yaml document of the capability definition, verify the validity of the template language of the capability definition, and verify the degree of satisfaction of the resources and underlying plug-in on which the capability definition depends on.

In an embodiment, it is possible to select a preset capability definition element during application orchestration. Meanwhile, various extended capability definitions can be utilized by means of the capability boundary according to the selected cloud platform instance. Or even the capability boundary can be ignored first, and all the capability definitions managed by the application orchestration device can be utilized, and then the capability boundary will be acted upon when the application is instantiated.

The application definition generated according to an embodiment of the present disclosure is packaged into a CHART package through Helm for execution of instantiation.

When instantiating an application, it is necessary to perform the actions defined by the capability. The capabilities defined in an embodiment of the present disclosure are provided by K8S CRD, and the corresponding capabilities CRD needs to be executed by the capability operator. The capability operator needs to provide the corresponding controller to realize the relevant logic. For the workload capability, the capability operator transforms the capability defined by CRD into the native resource of the cloud platform or user-defined resource according to the capability reference definition. And for trait capability, the operator executes the corresponding logic according to the capability template definition, and may even rely on the assistance of another operator or controller and underlying plug-ins on the cloud platform.

During the orchestration of the blueprint and the instantiation of the application according to an embodiment of the present disclosure, the cloud platform instance supporting this application can be selected according to the capability boundary. Under the corresponding conditions permit, it is also possible to choose to actively distribute the required capabilities of this application to the target cloud platform to empower the cloud platform and create application running conditions. The ultimate goal is to ensure that the defined application can be instantiated normally on the cloud platform and ensure the portability of the application between different cloud platforms.

It can be understood that the architecture for managing cloud platform according to an embodiment of the present disclosure further includes a capability database configured to store at least one capability template corresponding to at least one application capability. The capability database is connected to the application orchestration device through the first management device. The application orchestration device is further configured to generate a programmable application capability orchestration element according to the open application model, and the application capability orchestration element corresponds to the capability template.

FIG. 6 depicts a flowchart showing the sub-operations included in the operation S300 of the method for managing cloud platform described in FIG. 5.

As shown in FIG. 6, operation S300 includes but is not limited to operation S310.

At operation S310, a target cloud platform is determined from a plurality of candidate cloud platforms according to the capability boundary, the target cloud platform is intended for executing application instantiation.

In an embodiment, the application orchestration device can present all preset capabilities during orchestration, because the capability boundary of the device is the complete set of the cloud platform. At the same time, if one or more cloud platform instances where the defined application runs later can be made clear during the orchestration, the intersection of the capabilities of these cloud platform instances can be taken for utilization by the definer, so that the defined application can be instantiated in the target cloud platform normally.

In addition, it is not necessary to focus on the differences in the capability sets of various cloud platforms during the application orchestration, because some cloud platforms may be managed by the first management device later, and in addition, it is also possible to actively install various capabilities on cloud platform instances after being included in the first management device. Hence, a user can choose all the capability types managed by the first management device according to his own needs. During instantiation, candidate target cloud platform instances can be filtered according to the capability boundary. Only the cloud platform instances that support the capability boundary corresponding to all the capabilities required by this application are filtered out, for users to choose. In this way, it also effectively ensures the normal instantiation of the application in the target cloud platform.

In an embodiment, the first management device can further extend the capability set of the cloud platform instance and extend the capability boundary of some capabilities. If the corresponding capability definition package and the plug-in package on which the capability definition package depends are present in the first management device, it is possible to choose to distribute the capability definition package to the corresponding cloud platform for installation, so as to empower the cloud platform and enable the cloud platform to support the deployment of applications that were not originally supported.

FIG. 7 depicts a flowchart showing a method for managing cloud platform according to another embodiment of the present disclosure.

As shown in FIG. 7, the method according to an embodiment of the present disclosure further includes, but is not limited to, operation S400.

At operation S400, the first management device is controlled to determine a target application capability supported by the target cloud platform according to the target cloud platform and an application capability.

As shown in FIG. 8, the method according to an embodiment of the present disclosure further includes, but is not limited to, operation S410.

At operation S410, the first management device is controlled to send a target capability definition data packet corresponding to the target application capability to the target cloud platform.

In an embodiment, when a cloud platform is included in the management scope of the first management device, the first management device actively discovers the capability set supported by this cloud platform. Since the capability is defined by the specification of the open application model, all workload definition and trait definition examples can be queried through the K8S native interface, and detailed information such as the description of the corresponding capability and the scope of action can be obtained.

The capabilities discovered by the first management device will be persisted in the database of the first management device, thus there exists a table to store the corresponding relationship between the cloud platforms and capabilities, and finally forming the respective capability sets of multiple cloud platforms managed by the first management device.

It should be noted that different cloud platform instances can have identical or different capability sets.

In an embodiment, the first management device can support the capability types defined by the open application model specification, and support the predefined capability set. Such a predefined capability can be supported by most cloud platforms by default, such as the capabilities corresponding to the predefined resource types through K8S.

When a cloud platform is brought into the management of the first management device, it is first necessary to ensure that a capability operator is present in the cloud platform, and the capability operator is not present, the capability operator is distributed in a cloud-native way. When accessing the cloud platform, the first management device sends various preset capabilities to the target cloud platform, so that the cloud platform has corresponding capabilities. Because the capability definitions are K8S CRD, these capability definitions can be distributed in a K8S native way.

At the same time, the platform developer can define more capabilities through the specification of the open application model, bring them into the management of the first management device, and assign and distribute them to the corresponding cloud platform. It is also possible to employ various open-source capabilities in the K8S ecosystem in the cloud native community to import them into the first management device, so that the management capabilities of the first management device are continuously expanded. In addition, if the existing capability definition has changed, the capability definition can be re-distributed, and correspondingly updated on the target cloud platform.

It should be noted that if the capability definition package required by application definition and its dependent plug-in package already exists in this device, the capability definition package can be selected and distributed to the target cloud platform system for loading when the application is instantiated.

FIG. 9 depicts a flowchart showing sub-operations included in S200 in FIG. 5.

As shown in FIG. 9, operation S200 includes but is not limited to operation S210.

At operation S210, the second management device is controlled to verify the operation of the application capability from the first management device, to regulate the application capability according to the operation of the application capability, and to determine the capability boundary corresponding to the regulated application capability according to the regulated application capability.

In an embodiment, the newly-launched capability is subjected to a simulation and testing, auxiliary analysis on testing output by the capability testing sandbox, to ensure that the capability development meets the needs of users. The capability sandbox is a capability simulation operation environment, which is isolated from the production environment. Many capabilities-related logics are executed in simulation, and the real resource operation actions are not executed, which can simulate the practical operation effect of the capability to a certain extent, and assist the capability developers in determining the logic correctness according to the output. After the sandbox pre-test passes, the capability can be loaded into the formal cloud environment to provide services. And in the capability definition upgrade scenario, it is also possible to provide testing capability through webhook. At first, some capability creation requests are diverted to the implementation of the new version of the capability definition, and gradually replace the old version with the new version according to the implementation effect.

It is worth noting that since the method described in this embodiment and the architecture described in the above embodiment belong to the same concept of invention, the detailed embodiment of the method described in this embodiment can refer to the detailed embodiment of the architecture described above. The method includes all the improvements of the architecture in the above embodiment, and which will not be repeated here.

The method according to an embodiment of the present disclosure further includes, but is not limited to, operation S420.

At operation S420, a programmable application capability orchestration element is generated according to the open application model, where the application capability orchestration element corresponds to the capability template.

In an embodiment, the application capability orchestration element is generated through the open application model, so that users can flexibly utilize the application capability orchestration element accordingly, thereby further optimizing the application orchestration effect.

It is worth noting that since the method described in this embodiment and the architecture described in the above embodiment belong to the same concept of invention, the detailed embodiment of the method described in this embodiment can refer to the detailed embodiment of the architecture described above. The method includes all the improvements of the architecture in the above embodiment, and which will not be repeated here.

Example Embodiment Four

FIG. 10 depicts a flowchart showing the accessing of a cloud platform in the architecture for managing cloud platform according to an embodiment of the present disclosure.

As shown in FIG. 10, the accessing includes the following operations.

At operation S500, an operation for accessing the cloud platform instance is initiated.

At operation S510, a capability operator is distributed through the Helm client and the capability operator is loaded on a target cloud platform.

At operation S520, a determination is performed as to whether the capability operator is loaded successfully; operation S530 is carried out in response to a determination that the capability operator is loaded successfully, otherwise, operation S521 is carried out.

At operation S521, the failure of access to the cloud platform is prompted.

At operation S530: a template Chart for loading the preset capability is distributed through the Helm client, and each plug-in required by the preset template is loaded.

At operation S540, a determination is performed as to whether the preset capability is loaded successfully; and operation S550 is carried out in response to a determination that the preset capability is loaded successfully, otherwise, operation S541 is carried out.

At operation S541, the capability operator is unloaded, and a failure of the access to the cloud platform is prompted.

At operation S550, a capability supported by this recently accessed cloud platform is discovered through capability discovery.

At operation S560, a capability set data supported by the cloud platform is established in a capability definition database.

At operation S570, a capability management boundary is updated.

Example Embodiment Five

Figure 11:
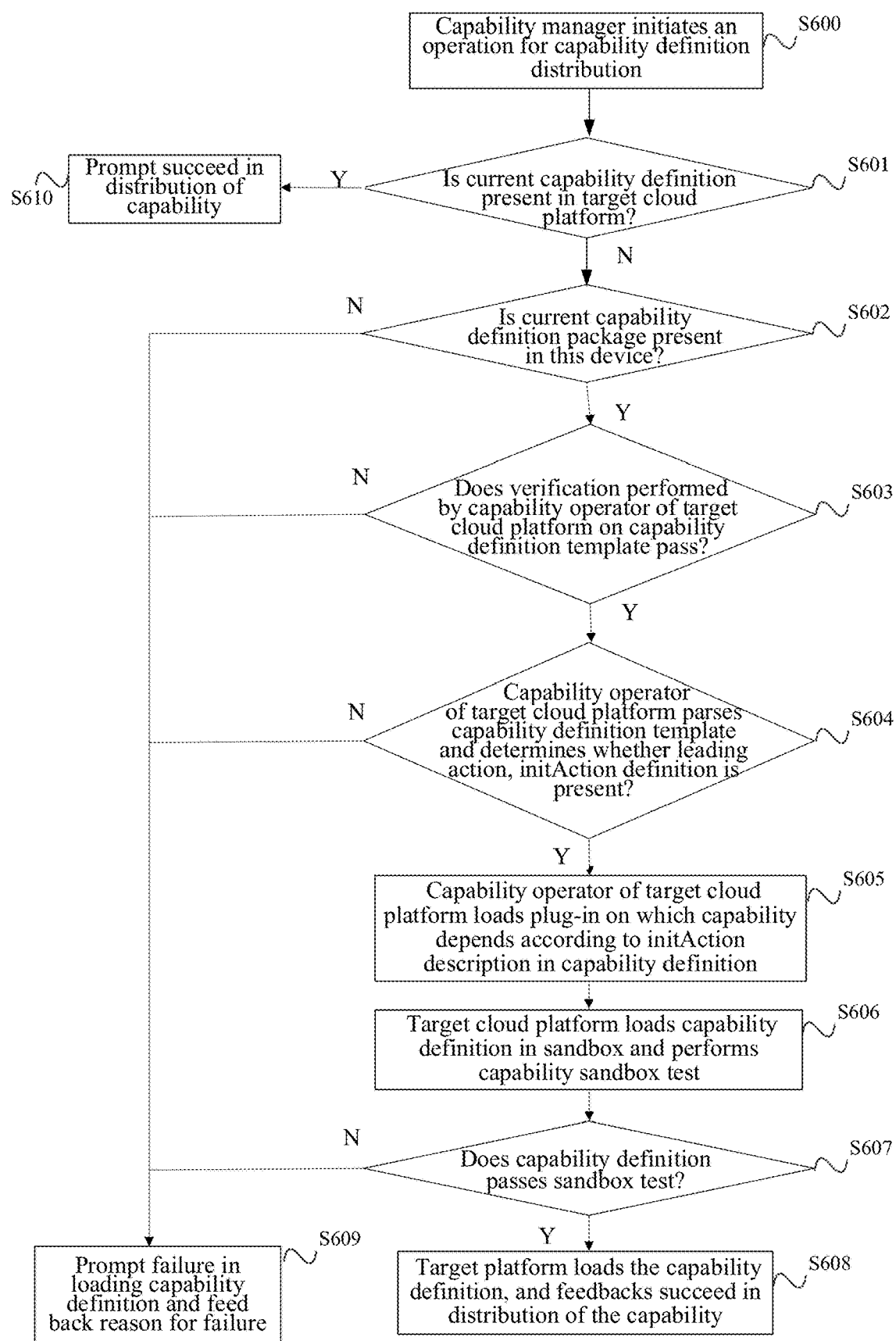
FIG. 11 depicts a flowchart showing the distribution of capability definitions to a lower-level cloud platform in the architecture for managing cloud platform according to an embodiment of the present disclosure.

FIG. 11 depicts a flowchart showing the distribution of capability definitions to a lower-level cloud platform in the architecture for managing cloud platform according to an embodiment of the present disclosure.

As shown in FIG. 11, the distribution includes the following operations.

At operation S600, the capability manager initiates an operation for capability definition distribution.

At operation S601, a determination is performed as to whether the current capability definition is present in the target cloud platform; and operation S610 is carried out in response to a determination that the current capability definition is present in the target cloud platform; otherwise, operation S602 is carried out.

At operation S602, a determination is performed as to whether the current capability definition package is present in this device; and the capability definition package is sent to the target platform and operation S603 is carried out in response to a determination that the current capability definition package is present in this device; otherwise, operation S609 is carried out.

At operation S603, the capability operator of the target cloud platform performs a verification on the capability definition template and determines whether the verification passes; and S604 is carried out in response to the verification passes; otherwise, operation S609 is carried out.

At operation S604, the capability operator of the target cloud platform parses the capability definition template and determines whether a leading action, "initAction" definition is present; and S605 is carried out in response to a determination that the leading action, "initAction" definition is present; otherwise, operation S609 is carried out.

At operation S605, the capability operator of the target cloud platform loads a plug-in on which the capability depends for the cloud platform according to the "initAction" description in the capability definition.

At operation S606, the target cloud platform loads the capability definition in a sandbox and performs a capability sandbox test.

At operation S607, a determination is performed as to whether the capability definition passes the sandbox test; and S608 is carried out in response to a determination that the capability definition passes the sandbox test; otherwise, operation S609 is carried out.

At operation S608, the target platform loads the capability definition, and feedbacks the success in the distribution of the capability.

At operation S609, a failure in loading the capability definition is prompted and the reason of the failure is fed back.

At operation S610, the success in distribution of the capability is prompted.

Example Embodiment Six

Figure 12:
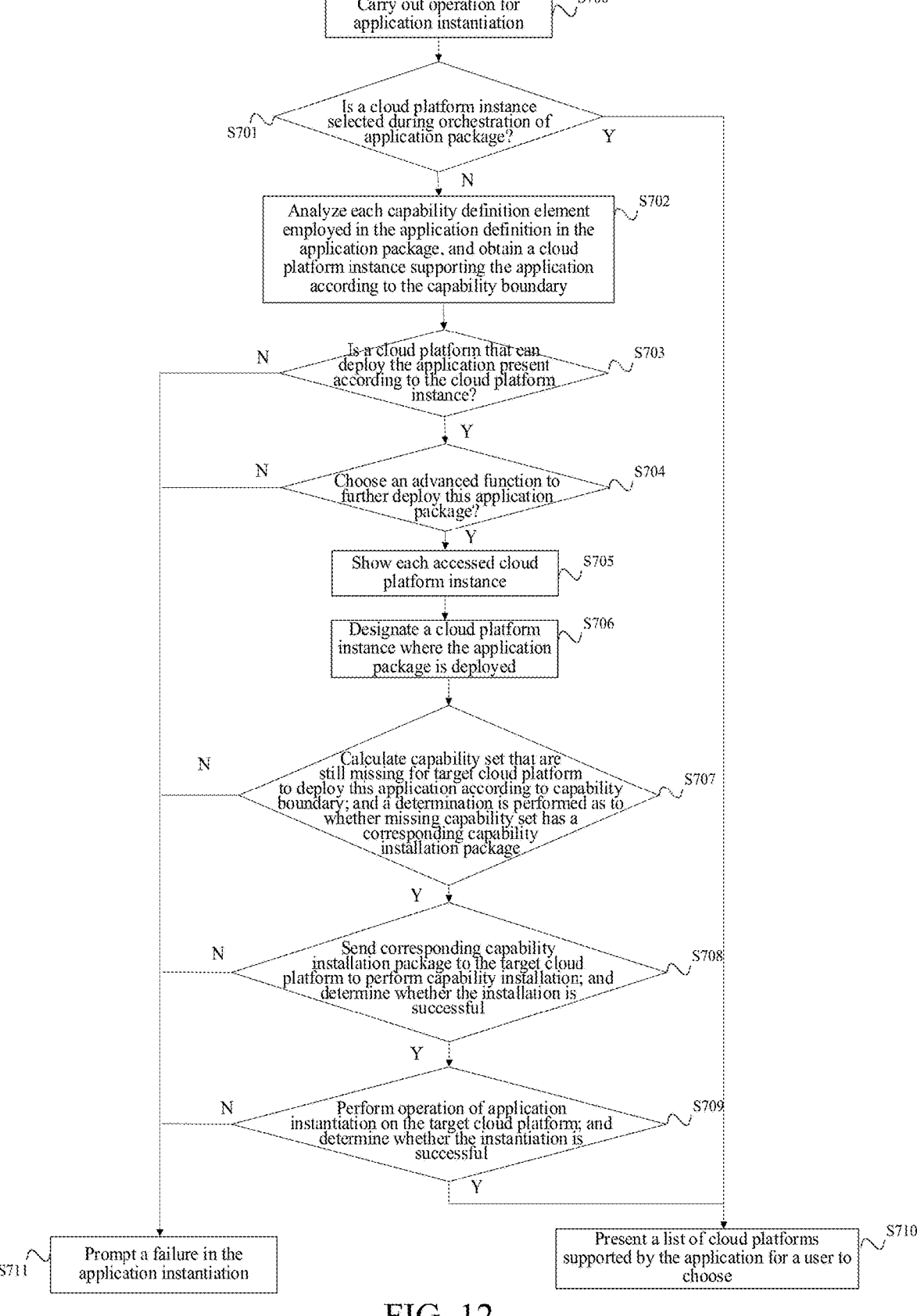
FIG. 12 depicts a specific flowchart showing the implementation of the application instantiation in the architecture for managing cloud platform according to an embodiment of the present disclosure.

FIG. 12 depicts a specific flowchart showing the implementation of the application instantiation in the architecture for managing cloud platform according to an embodiment of the present disclosure.

As shown in FIG. 12, the application instantiation includes the following operations.

At operation S700, an operation for application instantiation is carried out.

At operation S701, a determination as to whether a cloud platform instance is selected during the orchestration of the application package; and S710 is carried out in response to a determination that the cloud platform instance is selected during the orchestration of the application package; otherwise, operation S702 is carried out.

At operation S702, each capability definition element employed in the application definition in the application package is analyzed, and a cloud platform instance supporting the application is obtained according to the capability boundary.

At operation S703, a determination is performed as to whether a cloud platform that can deploy the application is present according to the cloud platform instance; and S710 is carried out in response to a determination that the cloud platform that can deploy the application is present; otherwise, operation S704 is carried out.

At operation S704, a determination is performed as to whether to choose an advanced function to further deploy this application package; and S705 is carried out in response to a determination to choose an advanced function to further deploy this application package; otherwise, operation S711 is performed.

At operation S705, each accessed cloud platform instance is shown.

At operation S706, a cloud platform instance where the application package is deployed is designated.

At operation S707, the capability set that is still missing for the target cloud platform to deploy this application is calculated according to the capability boundary; and a determination is performed as to whether the missing capability set has a corresponding capability installation package; and operation S708 is performed in response to a determination that the missing capability set has a corresponding capability installation package; otherwise, operation S711 is performed.

At operation S708, the corresponding capability installation package is sent to the target cloud platform to perform capability installation; and a determination is performed as to whether the installation is successful; and in response to a determination that the installation is successful, operation S709 is performed; otherwise, operation S711 is performed.

At operation S709, the operation of application instantiation is performed on the target cloud platform; and a determination is performed as to whether the instantiation is successful; and in response to a determination that the instantiation fails, a prompt is issued and operation S711 is performed.

At operation S710, a list of cloud platforms supported by the application is present for a user to choose.

At operation S711, a failure in the application instantiation is prompted.

It is worth noting that since the method described in this embodiment and the architecture described in the above embodiment belong to the same concept of invention, the detailed embodiment of the method described in this embodiment can refer to the detailed embodiment of the architecture described above. The method includes all the improvements of the architecture in the above embodiment, and which will not be repeated here.

An embodiment of the present disclosure provides a device for managing cloud platform, which includes the architecture for managing cloud platform as shown in the embodiment of FIG. 1 or the architecture for managing cloud platform as shown in the embodiment of FIG. 2.

Non-transitory software programs and instructions of the method for managing cloud platform described in the above embodiments are stored in a memory which, when executed by a processor, cause the processor to carry out operations of the method described above, for example, the above-described operations S100 to S300 described in conjunction with FIG. 5, S310 described in conjunction with FIG. 6, S400 described in conjunction with FIG. 7, S410 described in conjunction with FIG. 8, S210 described in conjunction with FIGS. 9, S500 to S570 described in conjunction with FIG. 10, S600 to S610 described in conjunction with FIG. 11, or S700 to S711 described in conjunction with FIG. 12 or S420.

It should be noted that the device for managing cloud platform set forth in this embodiment can be applied to the architecture with respect to the embodiment described FIG. 1 or FIG. 2. These embodiments belong to the same invention concept and have the same implementation principles and technical effects, and which will not be described in detail here.

The above-described device embodiments are only illustrative, in which the units illustrated as separate components may or may not be physically separated, that is, they may be located in one place or distributed over several network units. Some or all of the modules can be selected according to the practical needs to achieve the purpose of this embodiment.

In addition, an embodiment of the present disclosure further provides a computer-readable storage medium, which stores computer-executable instructions which, when executed by a processor or controller, for example, by a processor in the embodiment of the device, causes the processor to carry out the operations of the method for managing cloud platform, for example, the above-described operations S100 to S300 described in conjunction with FIG. 5, S310 described in conjunction with FIG. 6, S400 described in conjunction with FIG. 7, S410 described in conjunction with FIG. 8, S210 described in conjunction with FIGS. 9, S500 to S570 described in conjunction with FIG. 10, S600 to S610 described in conjunction with FIG. 11, or S700 to S711 described in conjunction with FIG. 12 or S420.

Provided is an architecture for managing cloud platform in an embodiment of the present disclosure. The architecture includes, a first management device, configured to define at least one application capability based on an open application model; where each application capability is indicative of a workload supported by a cloud platform or an operation and maintenance trait acting on the workload; a second management device; where the second management device is connected to the first management device, and is configured to determine a capability boundary corresponding to the application capability according to the application capability from the first management device; and the capability boundary is indicative of each candidate cloud platform supporting the application capability; an application orchestration and instantiation device; where the application orchestration and instantiation device is connected to the first management device, and is configured to determine a strategy for an application orchestration and instantiation for each of the candidate cloud platforms according to the capability boundary. According to the scheme provided in an embodiment of the present disclosure, a plurality of application capabilities are defined through the first management device under the specific scenario of the open application model, so that it is possible to provide the capability abstraction of the cloud-native applications, thereby matching the differentiated scenarios of each cloud platform, enhancing the portability of the cloud-native applications among the cloud platforms. And the capability boundary of the candidate cloud platform supporting the defined application capabilities is determined through the second management device, to help the application orchestration and instantiation device determine the application orchestration and instantiation strategy for each candidate cloud platform through the capability boundary, so as to manage the differentiated scenarios of multiple cloud platforms and achieve the effect of optimizing the application orchestration and instantiation.

It shall be appreciated by a person having ordinary skills in the art that all or some of the steps and systems disclosed above can be implemented as software, firmware, hardware and their appropriate combinations. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage medium (or non-transitory medium) and communication medium (or transitory medium). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Described above is a description of several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. An architecture for managing cloud platforms, comprising,
   a first management device, configured to define at least one application capability based on an open application model, wherein each application capability is indicative of a workload supported by a cloud platform or an operation and maintenance trait acting on the workload;
   a second management device, wherein the second management device is connected to the first management device, and is configured to determine a capability boundary corresponding to the application capability from the first management device according to the application capability, and the capability boundary is indicative of each of at least one candidate cloud platform supporting the application capability; and
   an application orchestration and instantiation device, wherein the application orchestration and instantiation device is connected to the first management device, and is configured to determine for each of the at least one candidate cloud platform, a strategy for an application orchestration and instantiation according to the capability boundary.

2. The architecture according to claim 1, wherein the application orchestration and instantiation device is further configured to determine a target cloud platform for performing the application orchestration and instantiation, from the at least one candidate cloud platform according to the capability boundary.

3. The architecture according to claim 2, wherein the first management device is further configured to determine a target application capability supported by the target cloud platform according to both the target cloud platform and the application capability.

4. The architecture according to claim 2, wherein the second management device is configured to verify an operation of the application capability from the first management device, to regulate the application capability according to the operation of the application capability, and to determine the capability boundary corresponding to the regulated application capability according to the regulated application capability.

5. The architecture according to claim 3, wherein the first management device is further configured to send a target capability definition data packet corresponding to the target application capability to the target cloud platform.

6. The architecture according to claim 3, wherein the second management device is configured to verify an operation of the application capability from the first management device, to regulate the application capability according to the operation of the application capability, and to determine the capability boundary corresponding to the regulated application capability according to the regulated application capability.

7. The architecture according to claim 5, wherein the second management device is configured to verify an operation of the application capability from the first management device, to regulate the application capability according to the operation of the application capability, and to determine the capability boundary corresponding to the regulated application capability according to the regulated application capability.

8. The architecture according to claim 1, wherein the second management device is configured to verify an operation of the application capability from the first management device, to regulate the application capability according to the operation of the application capability, and
   to determine the capability boundary corresponding to the regulated application capability according to the regulated application capability.

9. The architecture according to claim 1, further comprising a capability database configured to store at least one capability template corresponding to the at least one of application capability;
   wherein the capability database is connected to the application orchestration and instantiation device through the first management device.

10. The architecture according to claim 9, wherein the application orchestration and instantiation device is further configured to generate a programmable application capability orchestration element according to the open application model, wherein the application capability orchestration element corresponds to the capability template.

11. A method for managing cloud platforms, which is applied to an architecture for managing cloud platforms comprising a first management device and a second management device connected to the first management device, the method comprising,
   controlling the first management device to define at least one application capability based on an open application model, wherein each application capability is indicative of a workload supported by a cloud platform or an operation and maintenance trait acting on the workload;
   controlling the second management device to determine a capability boundary corresponding to the application capability from the first management device according to the application capability, wherein the capability boundary is indicative of each of at least one candidate cloud platform supporting the application capability; and
   determining for each of the at least one candidate cloud platform, a strategy for an application orchestration and instantiation according to the capability boundary.

12. The method according to claim 11, wherein determining for each of the at least one candidate cloud platform, the strategy for the application orchestration and instantiation according to the capability boundary comprises,
   determining a target cloud platform from the at least one candidate cloud platform according to the capability boundary, wherein the target cloud platform is configured to perform the application orchestration and instantiation.

13. The method according to claim 12, wherein after determining for each of the at least one candidate cloud platform, the strategy for the application orchestration and instantiation according to the capability boundary, the method further comprises,
   controlling the first management device to determine a target application capability supported by the target cloud platform according to both the target cloud platform and the application capability.

14. The method according to claim 12, wherein controlling the second management device to determine the capability boundary corresponding to the application capability from the first management device according to the application capability comprises,
   controlling the second management device to verify an operation of the application capability from the first management device, to regulate the application capability according to the operation of the application capability, and to determine the capability boundary corresponding to the regulated application capability according to the regulated application capability.

15. The method according to claim 13, wherein after controlling the first management device to determine the target application capability supported by the target cloud platform according to both the target cloud platform and the application capability, the method further comprises, controlling the first management device to send a target capability definition data packet corresponding to the target application capability to the target cloud platform.

16. The method according to claim 13, wherein controlling the second management device to determine the capability boundary corresponding to the application capability from the first management device according to the application capability comprises, controlling the second management device to verify an operation of the application capability from the first management device, to regulate the application capability according to the operation of the application capability, and to determine the capability boundary corresponding to the regulated application capability according to the regulated application capability.

17. The method according to claim 11, wherein controlling the second management device to determine the capability boundary corresponding to the application capability from the first management device according to the application capability comprises, controlling the second management device to verify an operation of the application capability from the first management device, to regulate the application capability according to the operation of the application capability, and to determine the capability boundary corresponding to the regulated application capability according to the regulated application capability.

18. The method according to claim 11, wherein the architecture further comprises a capability database configured to store at least one capability template corresponding to the at least one application capability, and the capability database is connected to the application orchestration and instantiation device through the first management device; and the method further comprises, generating a programmable application capability orchestration element according to the open application model, wherein the application capability orchestration element corresponds to the capability template.

19. A device for managing cloud platforms, comprising a memory, a processor and a computer program stored in the memory and executable by the processor which, when executed by the processor causes the processor to carry out the method as claimed in claim 11.

20. A non-transitory computer-readable storage medium storing a computer-executable instruction which, when executed by a processor, causes the processor to carry out the method as claimed in claim 11.

* * * * *